March 3, 1942.   S. GARGIULE ET AL   2,275,360
ROTARY RAKE ATTACHMENT
Filed Oct. 28, 1940

Samuel Gargiule
and Frank Taranta, INVENTORS
BY Victor J. Evans & Co.
ATTORNEYS

Patented Mar. 3, 1942

2,275,360

UNITED STATES PATENT OFFICE 2,275,360

ROTARY RAKE ATTACHMENT

Samuel Gargiule and Frank Taranta,
Plainfield, N. J.

Application October 28, 1940, Serial No. 363,215

3 Claims. (Cl. 56—249)

The present invention relates to an improved rotary rake attachment for lawn mowers and similar devices.

The primary object of the invention resides in the provision of an attachment adapted to be disposed in front of the cutting mechanism of a lawn mower and rotatably driven for lifting the roots of weeds, crab grass and the like so that they may be cut off easily by the mower.

Another object of the invention resides in the provision of a rake rotatably held in front of the cutting blades of a lawn mower which is readily adaptable to various types of lawn mowers.

A further object of the invention resides in the provision of an attachment of the above character embodying novel means for attaching the same to the mower and for permitting adjustment thereof after attachment to adapt itself for lifting various types of long grass, weeds and also grass that has fallen over, to a position where the cutting blades of the mower can readily cut the same.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which.

Figure 1:
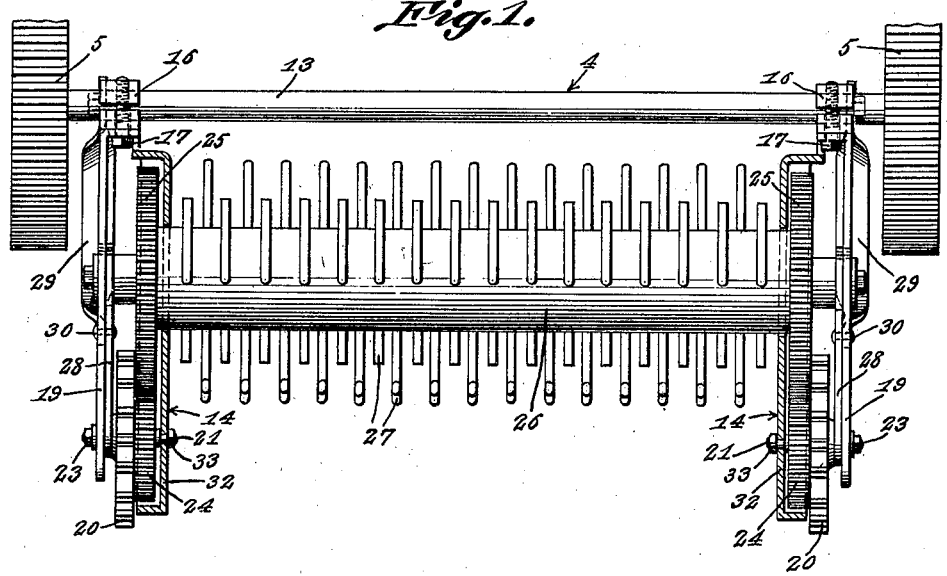
Figure 1 is a top plan view of the attachment embodying the features of the present invention.
Figure 2:
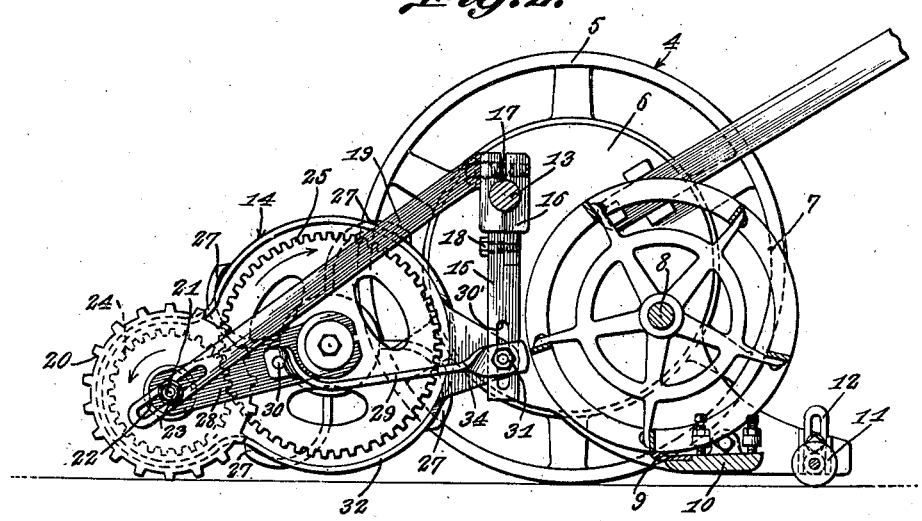
Figure 2 is an end view of the attachment illustrating its relative position with a lawn mower, parts of the lawn mower being shown in section.

Referring to the drawing for a more detailed description thereof, a lawn mower of conventional construction is generally designated by the reference numeral 4 which includes wheels 5, gear casing element 6 associated with the wheels, a rotary cutter 7 mounted on a shaft 8 driven by said gear elements. A stationary blade 9 cooperates with the rotary cutter 7, the same being adjustably carried by the transversely disposed bar 10. Adjustment of the rotary cutter 7 is obtained through the roller 11 which is adjustably mounted in brackets 12 in a manner well known in the art. The parts above described are of conventional construction and form no part of the present invention.

A tie bar 13, which is also a conventional part of a lawn mower, is rigidly disposed between the gear casing elements and forms the means for supporting the attachment generally designated by the reference numeral 14. Vertically disposed brackets 15 are carried on opposed ends of the bar 13, the upper ends of said brackets being formed with caps 16 held in clamping relation around the bar by means of stud bolts or the like 17. The cap 16 is separable from the bracket 15 being held thereto at its lower end by means of a stud bolt 18. Attached to the upper end of the brackets 15 and held thereon by means of the stud bolts 17 are a pair of diagonally disposed arms 19 supporting track wheels 20 on the free ends thereof, said wheels having individual stub shafts 21 which extend through an elongated slot 22 formed in the attaching end of said arms 19. A nut 23 in engagement with the stub shaft 21 retains the wheels in position in the slot 22.

Also mounted on each stub shaft 21 and adapted to rotate therewith is a gear 24, said gear meshing with and driving a larger gear 25.

The gears 25 support therebetween a roller 26, said gears being suitably secured on the ends of the roller. The roller 26 carries staggered rows of rake teeth 27 arranged in spaced relation and adapted upon rotation of the gears to lift the roots of weeds, crab grass and the like so that they may be cut off easily by the cutter 7 of the mower. As is to be understood, the roller 26 rotates with the gears 25, which gears are driven by the gears 24.

Means have been provided for raising or lowering the tooth-carrying roller 26 which means includes brackets 28 on each side of the attachment having one end secured to each stub shaft 21 and the other end frictionally held on the end of the roller 26. A second bracket 29 is riveted or otherwise secured as indicated at 30' to the brackets 28, the other end of said brackets being adjustably held within a slot 30 formed in the lower end of the bracket 15 and retained by means of a nut and bolt 31. Raising and lowering the end of the bracket 29 within the limits of the slot 30' will raise or lower the gears 25 and roller 26 to bring the rake teeth 27 closer to or away from the ground.

The meshed gears are protected by means of a housing 32, the same being held on the stub shafts of the wheels by means of nuts 33 with the inner ends of the housings being formed with an ear 34 in engagement with the brackets 15 and held thereon by means of the nut and bolt fastener 31. The housings 32 protect the gears from grass, dirt and the like.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In an attachment for a lawn mower, a pair of vertically disposed brackets mounted on the opposed end portions of a cross bar of the mower, an arm fastened to the upper end of each of the said brackets and extending forwardly and downwardly therefrom, a transversely extending shaft mounted in the outer end of each arm, a rotary ground engaging wheel mounted on the said shaft, a spur gear mounted beside and rotatable with the ground engaging wheel, a housing section having its inner portion attached to the lower part of each depending bracket and its front portion supported on the said shaft, a tooth-carrying roller rotatably mounted on the inner portions of the said housing sections, a gear connected with each end of the said roller in mesh with the gear rotating with the ground wheels and operable during movement of the mower to rotate the roller and the teeth carried thereon.

2. In an attachment for a lawn mower having a transversely mounted cross bar, a vertically depending bracket secured to each end portion of the cross bar, a longitudinally extending arm attached to the upper end of the bracket and extending forwardly and downwardly therefrom, the outer end of the said arm having a longitudinally elongated slot, a transversely extending stub shaft mounted on the slotted portion of the arm and longitudinally adjustable thereon, a rotary ground engaging wheel mounted on the said stub shaft, a spur gear mounted at one side of the said wheel and rotatable therewith, a housing section at each side of the mower extending forwardly thereof, a lug on the rear end of each housing section adjustably connected with the lower end portion of each bracket, a transversely extending roller having its ends journalled in openings in the inner portions of the said housing sections, a multiplicity of rake teeth attached to and extending radially from the said roller, a relatively large spur gear secured on each end of the roller and in mesh with the spur gear mounted on the outer portion of each housing section whereby rotation of the ground wheels will effect rotary operation of the tooth-carrying roller.

3. In an attachment for a lawn mower having a transversely mounted cross bar, a vertically depending bracket secured to each end portion of the cross bar, a longitudinally extending arm attached to the upper end of the bracket and extending forwardly and downwardly therefrom, the outer end of the said arm having a longitudinally elongated slot, a transversely extending stub shaft mounted on the slotted portion of the arm and longitudinally adjustable thereon, a rotary ground engaging wheel mounted on the said stub shaft, a spur gear mounted on one side of the said wheel and rotatable therewith, a housing section at each side of the mower extending forwardly thereof, a lug on the rear end of each housing section adjustably connected with the lower end portion of each bracket, a transversely extending roller having its ends journalled in openings in the inner portions of the said housing sections, a multiplicity of rake teeth attached to and extending radially from the said roller, a relatively large spur gear secured on each end of the roller and in mesh with the spur gear mounted on the outer portion of each housing section whereby rotation of the ground wheels will effect rotary operation of the tooth-carrying roller, a spacing member mounted at each side of the mower having its forward end connected with the stub shaft and its rear end frictionally engaging the end of the roller and a support element connecting the rear end of the said spacing member with the depending support bracket.

SAMUEL GARGIULE.
FRANK TARANTA.